COLOR TELEVISION APPARATUS

Filed May 1, 1956 3 Sheets-Sheet 1

INVENTORS
ROLAND N. RHODES &
CHARLES B. OAKLEY
BY
ATTORNEY

July 7, 1959 C. B. OAKLEY ET AL 2,894,061

COLOR TELEVISION APPARATUS

Filed May 1, 1956 3 Sheets-Sheet 2

INVENTORS
ROLAND N. RHODES &
CHARLES B. OAKLEY
BY
ATTORNEY

July 7, 1959 C. B. OAKLEY ET AL 2,894,061

COLOR TELEVISION APPARATUS

Filed May 1, 1956 3 Sheets-Sheet 3

INVENTORS
ROLAND N. RHODES &
CHARLES B. OAKLEY
BY [signature]
ATTORNEY

United States Patent Office 2,894,061

Patented July 7, 1959

2,894,061

COLOR TELEVISION APPARATUS

Charles B. Oakley, Hamilton Square, N.J., and Roland N. Rhodes, Levittown, Pa., assignors to Radio Corporation of America, a corporation of Delaware Application May 1, 1956, Serial No. 581,989

10 Claims. (Cl. 178—5.4)

The present invention relates to new and improved apparatus for controlling the operation of color television receivers and, particularly, to control circuitry for controlling the color signal processing circuits of such receivers.

In accordance with the color television standards promulgated by the Federal Communications Commission on December 17, 1953, the transmitted composite color television signal includes, in addition to scanning synchronizing information in the form of pulses, a luminance signal which is indicative of the brightness of elemental areas of the image being televised and a chrominance signal in the form of a phase- and amplitude-modulated subcarrier wave which is representative of the hue and saturation of the image. The subcarrier wave has a nominal or mean frequency of approximately 3.58 mcs. In order to detect the color information, it is necessary to provide some form of demodulating apparatus in the receiver, which apparatus may comprise synchronous demodulating circuitry serving to compare the incoming subcarrier wave with a locally produced color reference subcarrier wave. Synchronization of the receiver color reference oscillator is accomplished through the use of a color reference "burst" component transmitted periodically with the composite signal, the burst being a plurality of cycles of the frequency of the subcarrier wave and of reference phase. In accordance with the standards mentioned above, a burst of subcarrier wave energy is superimposed on the "back porch" of each horizontal blanking pulse.

Since, in the reconstruction of the television image at the receiver, the saturation of the image is dependent upon the amplitude of the chrominance signal or subcarrier information, it is importanct that the gain of the receiver be controlled in such manner as to insure proper amplitude of the chrominance signal with respect to the luminance signal. Thus, the amplifying channel which operates upon the color signal in a receiver is conventionally provided with automatic gain control circuit. Such control has been termed and will be referred to herein as "automatic chroma control" (A.C.C.).

Moreover, in order that the receiving apparatus designed for color television image reproduction may also serve to reproduce high quality black and white pictures when receiving ordinary monochrome signals, the receiver may be arranged in such manner as to arrest or disable the color demodulating circuits when monochrome television signals are being received. Such an arrangement is termed a "color killer circuit" and will be so designated herein.

It is an object of the present invention to provide new and improved apparatus for affording the requisite color killer function in a color television receiver.

In general, the present invention comprises means for utilizing one of the chrominance signal amplifiers as a "self-killing" circuit, thereby eliminating the need for conventional color killer tubes and associated circuitry. Specifically, the present invention exploits that characteristic of an amplifier including a controlled electron flow path device of the "constant current" type (e.g., a pentode vacuum tube or semiconductor amplifier) whereby the gain of the amplifier is a function of the output electrode (e.g., anode or collector) voltage below a certain voltage level. In accordance with one specific form of the invention, an otherwise conventional pentode-type chrominance amplifier which is subject to automatic chroma control is provided with a direct current impedance in its anode circuit. This impedance is of such value that, as the ACC voltage varies the amplifier bias from a normal negative value for color signal reception to a substantially less negative value during reception of a monochrome signal, the operating point of the pentode is shifted below the knee of its characteristic curves. Thus, the anode voltage and, therefore, the amplifier gain are changed from a normal condition to a substantially inoperative one, thereby effectively disabling the color channel of the receiver.

Means are additionally provided in certain arrangements wherein the source of ACC voltages follows the chrominance amplifier for periodically rendering the chrominance amplifier operative for short periods in order that the amplifier channel may resume normal operation for color signal reception. According to another aspect of the invention, means are provided for improving the color synchronizing burst separation action of a color receiver. It will be appreciated that the present invention results in an appreciable simplification of color receiver circuitry.

Additional objects and advantages of the present invention will become apparent to those skilled in the art from a study of the following detailed description of the accompanying drawings, in which.

Figure 1:
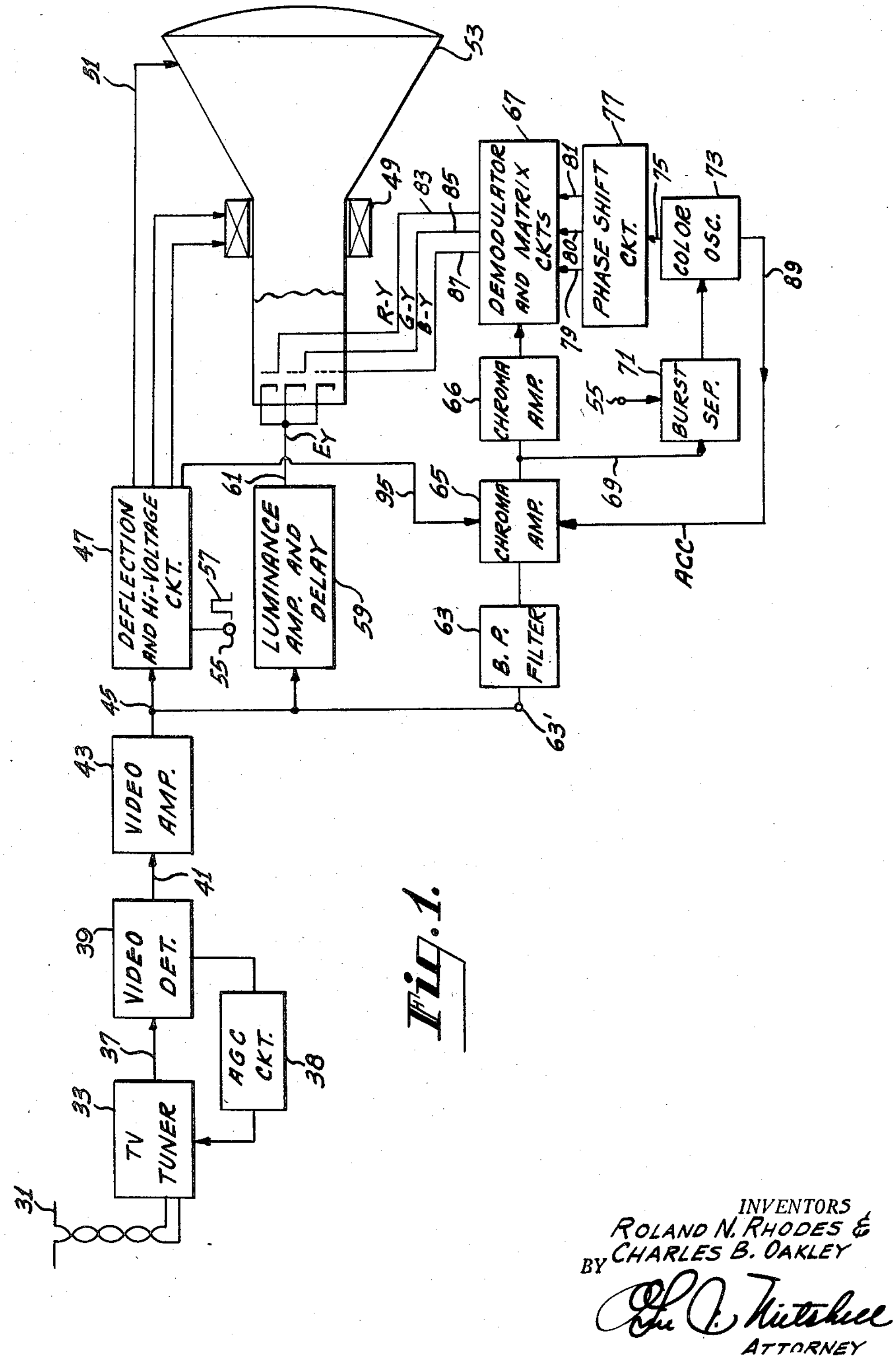
Figure 1 is a block diagram of a color television receiver employing the principles of the present invention.

There is shown in Figure 1 a block diagram of a color television receiver with which the present invention may be employed. An incoming carrier wave, amplitude-modulated by the composite color television signal, is intercepted by an antenna 31 and is applied to a tuner section 33 which includes radio frequency amplification stages, a mixer or first detector wherein the modulated carrier wave is translated in frequency to an intermediate frequency range and an intermediate frequency (IF) amplifier. The amplified IF signals are applied via a lead 37 to a second or video detector 39 which provides at its output terminal 41 the detected composite color television signal including scanning synchronizing pulses, bursts of subcarrier energy (i.e., color synchronizing bursts) on the "back porch" of the horizontal blanking pedestals and the broad band of video signals including luminance and chrominance components. The gain of the IF amplifier stages of the tuner 33 is automatically controlled by a conventional AGC circuit 38.

The composite signal thus recovered from the video detector 39 is amplified in a broad band video amplifier stage 43 and is applied simultaneously to several channels of the receiver, as follows: the signal is applied via a lead 45 to the deflection and high voltage circuits 47 comprising suitable means for generating scanning sawtooth current waves of television line and field frequencies for application to the electromagnetic deflection yoke 49. In a well known manner, the flyback voltage pulses produced in the horizontal deflection circuit are rectified to produce a high, unidirectional positive potential for application via lead 51 to the final anode of the tri-color kinescope 53. Also produced by the deflection circuits 47 and provided at the terminal 55 are burst gating pulses 57 corresponding to the horizontal flyback pulses and having a duration corresponding substantially to that of the color synchronizing burst referred to above. The gating pulses 57 may be produced, for example, through the agency of a flyback winding on the horizontal deflection output and high voltage transformer forming a part of the horizontal deflection circuit.

The luminance signal component of the composite received television signal is applied from the video amplifier 43 to a luminance amplifier and delay circuit represented by the block 59 which provides at its output terminal 61 the luminance signal $E_Y$ for application to the cathodes of the color image reproducing kinescope 53.

The composite color television signal is also applied to a chrominance bandpass filter 63 which serves to separate the subcarrier wave or chrominance signal information from the composite signal. The chrominance signal is, in turn, applied via first and second chrominance bandpass amplifiers 65 and 66 to the demodulator and matrix circuit 67. The demodulators and matrix 67 may be understood as performing a process of synchronous demodulation upon the chrominance signal to derive therefrom the "color-difference" signals employed in modulating the phase and amplitude of the subcarrier wave at the transmitter. A detailed discussion of the operation of such circuitry may be found in an article entitled "Color Television Signal Receiver Demodulators" by D. H. Pitchard and R. N. Rhodes, June 1953 issue of the RCA Review.

The demodulating action requires the provision of subcarrier frequency waves of fixed phase with respect to a reference, which waves may be derived from a color reference oscillator 73 producing a continuous 3.58 mcs. wave and synchonized as to phase and frequency by the color synchronizing bursts accompanying the composite signal. Specifically, the composite signal may be applied from the output of the first chroma amplifier 65 via a lead 69 to a burst separator circuit 71 which receives, from the terminal 55 of the deflection circuits, the burst gating pulses 57 which are applied to the burst separator circuit via the terminal 55'. The separated color synchronizing bursts are employed in synchronizing the operation of the color reference oscillator 73 in a manner to be described hereinafter. The output wave from the oscillator 73 may be applied via a lead 75 to a phase shifting circuit 77 which provides, at its output leads 79, 80 and 81, subcarrier waves of fixed phase with respect to the phase of the reference burst for application to the demodulators and matrix contained within the block 67. Through the process of synchronous demodulation, the circuit 67 produces the color-difference signals $R-Y$, $G-Y$, and $B-Y$, where R, G and B represent the component color signals and Y represents the luminance signal. The color-difference signals from the demodulators in the circuit 67 are applied to the beam intensity controlling electrodes of the color kinescope 53 via the leads 83, 85 and 87, respectively, so that the kinescope serves to combine the color-difference signals with the luminance signal in such manner that the intensities of the respective beams of the kinescope are controlled in accordance with the component colors of the image being reproduced.

As is shown in the figure, a control voltage may also be derived from the color reference oscillator 73, in a manner to be described, while voltage is applied via a lead 89 to the chroma amplifier 65. This voltage is applied as an automatic chroma control voltage to the chroma amplifier 65 for controlling its grid bias to maintain the amplitude of the chrominance signal constant with respect to the luminance signal being processed in the channel 59. The chrominance amplifier of the present invention is so arranged that it responds to the ACC voltage in such manner as to render the chrominance amplifier channel inoperative during the reception of a monochrome television signal lacking the color synchronizing bursts or a signal in which the chrominance information as evidenced by burst amplitude is below a predetermined level. In accordance with certain specific forms of the invention and for purposes to be described herein, the novel chrominance amplifier 65 may also be supplied with horizontal flyback pulses from the deflection circuits 47 via a lead 95.

Figure 2:
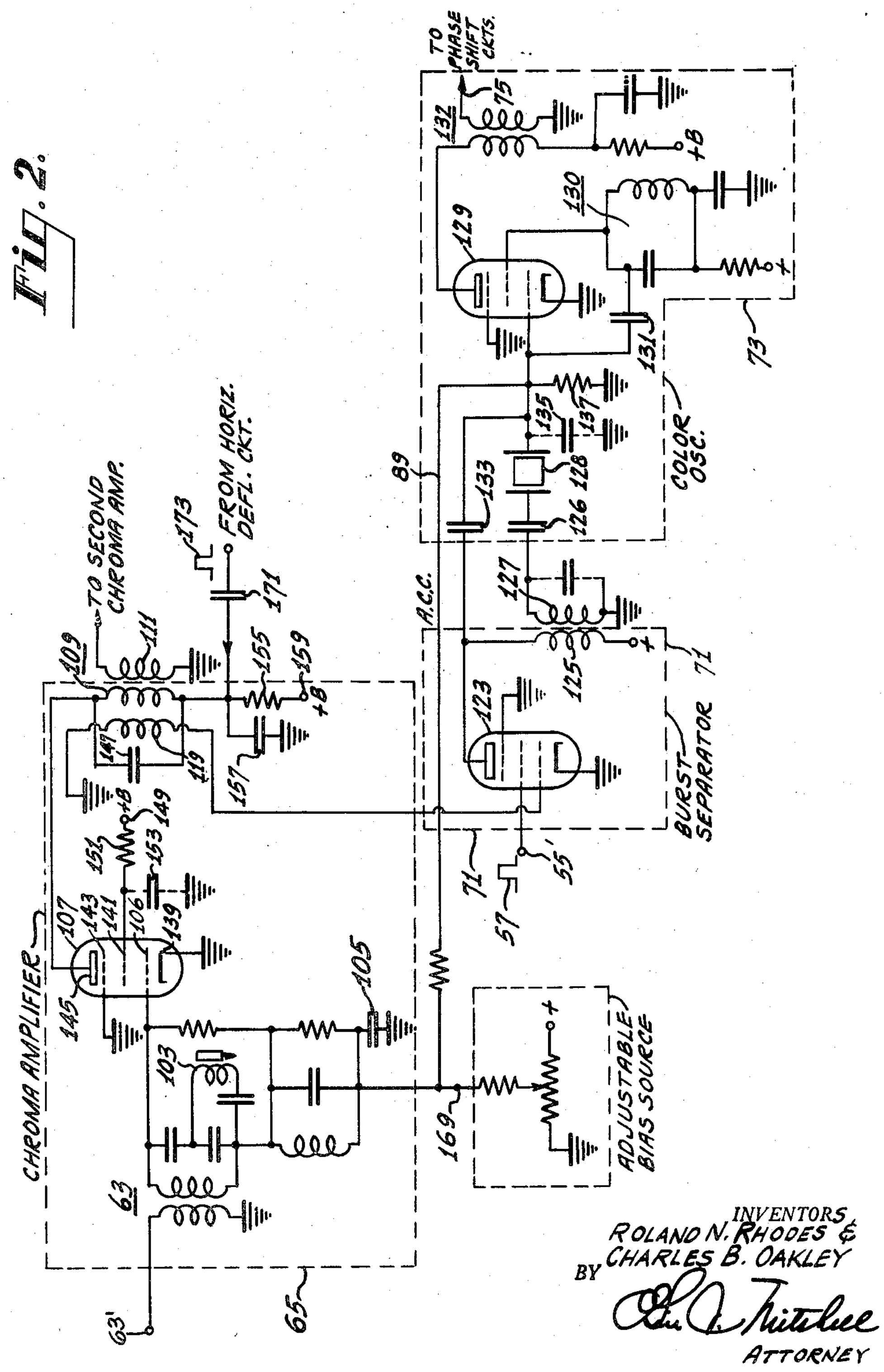
Figure 2 is a schematic diagram illustrating certain circuitry in accordance with a specific form of the invention in which the controlled electron flow path device is a vacuum tube amplifier.

Figure 2 is a schematic diagram illustrating one form of chrominance amplifier in accordance with the invention, together with circuitry of the burst separator 71 and the burst-synchronized oscillator 73 of Figure 1. In the chrominance channel, the color television signal is applied to the input terminal 63' and appears across the bandpass filter 63. The bandpass filter 63 has a bandpass from approximately 2 to 4.2 mcs. if high frequency color information is to be demodulated by the demodulator channel 75, or from 3 to 4.2 mcs. if lower frequency color information is to be demodulated. The coil 103 is a resonant circuit which is used to trap sound information at approximately 4.5 mcs. The bandpass filter 63 is bypassed to ground by the bypass condenser 105, and is connected to the control grid 106 of the tube 107. The tube 107 is part of the chrominance bandpass amplifier 65 of the present invention and is responsive to the frequency range of the color television signal developed across the bandpass filter 63 so that the amplified chrominance signal appears across the output coil 109. Prior to describing the amplifier 65 in detail, however, the environmental circuitry of Figure 2 will be described.

The chrominance signal developed across the coil 109 is coupled to the winding 111 and passed to the control grid of the amplifier 66 of Figure 1. Application of the signal to the control grid of the second chroma amplifier may be accomplished via a potentiometer (not shown) which provides contrast control.

The tube 107 of the chrominance amplifier channel also develops the color synchronizing bursts across coil 109 during the portion of the retrace interval following the horizontal synchronizing pulse. Through the agency of the coil 119, which is inductively coupled to the coil 109, the chrominance signal including the color synchronizing bursts is applied to a control grid of the normally non-conductive tube 123 of the burst separator 71. At the same time, the positive gating pulse 57 from the terminal 55 is applied via the terminal 55' to a second control grid of the tube 123. Since the color synchronizing burst and the keying pulse 57 occur generally in coincidence, the burst separator tube 123 conducts only during burst time so that the burst is separated from the remainder of the chrominance signal. The separated burst thus is caused to appear across the inductance 125 which is the burst input circuit of the burst synchronized oscillator 73. Although neither the specific form of oscillator nor the circuitry for providing ACC voltage to be described herein constitutes a part of the present invention, Figure 2 illustrates one commercially feasible arrangement for performing both functions.

An inductance 127, inductively coupled to the inductance 125, applies the separated bursts to the piezoelectric crystal 128 of the oscillator circuit 73 via a capacitor 126. The color synchronizing burst is filtered by the crystal 128 and transformed into a ringing signal which is applied to the first control grid of the tube 129. The tube 129 is coupled to provide feedback from its screen grid to the first control grid by way of a resonant circuit 130 and the bypass capacitor 131, so that oscillation occurs, which oscillation is synchronized by the burst-induced ringing signal from the crystal 128. The burst-synchronized oscillations are thereupon developed at the output circuit 132 and are applied to the output lead 75.

A capacitor 133 provides a neutralizing path from the anode side of the inductance 125 to the control grid of the tube 129 to provide a coupling for burst voltage from the inductance 125 to the first control grid of the tube 129 of proper phase to neutralize, at the first control grid, any burst sidebands passing through any shunt capacitance of the crystal 128.

Insofar as the crystal 128 is concerned, the circuit may be considered as one in which the inductive winding 127 constitutes an inductive generator whose inductive impedance is in series with the capacitor 126, the primarily inductive impedance of the crystal 128 and the input capacity 135 of the oscillator tube 129 which may, for example, comprise a capacitance of 15 mmf. The circuit may thus be understood as a series resonant circuit at the color subcarrier wave frequency, such that when the burst is applied from the inductance 127 to the crystal, the reactive components series-resonate to produce a substantially continuous wave at the subcarrier wave frequency. By virtue of the high Q of the the crystal, it forms a highly selective filter circuit which enhances the noise immunity of the oscillator. The continuous wave produced on the control grid of the tube 129 by the ringing circuit just described adds in phase with the oscillator energy fed back to that point from the screen grid of the tube via the network 130 and capacitor 131. The resultant voltage at the control grid of the tube 129 is, therefore, a continuous wave of subcarrier frequency whose amplitude varies as a function of the amplitude of the bursts provided by the burst separator circuit 71 to the crystal circuit of the oscillator. For example, in the circuit shown in Figure 2, the amplitude of the continuous wave energy at the control grid of the oscillator tube may vary from 8 volts peak-to-peak when no burst is present to 30 volts peak-to-peak when bursts of normal amplitude are supplied to the oscillator.

It will further be noted that the control grid of the oscillator tube 129 is connected to ground via a grid leak resistor 137. Depending upon the amplitude of the continuous wave present at the control grid of the oscillator tube, that tube will draw grid current in varying degrees proportional to the continuous wave amplitude.

Since, as stated, the oscillator tube 129 is driven into grid current by the positive-going peaks of the continuous wave of voltage on its control grid, a direct current voltage of negative polarity is produced at the lead 89 connected to the control grid of the tube. This voltage will, moreover, vary in amplitude as a function of variations in the amplitude of the ringing voltage produced by the crystal circuit, which amplitude variation, in turn, is a function of the amplitude of the bursts applied to the inductive winding 127. Thus, if the amplitude of bursts supplied by the separator circuit 71 should decrease, the voltage at the lead 89 will become less negative. Conversely, an increased burst amplitude will result in a more negative direct current voltage at the lead 89. The direct current voltage produced by grid current rectification in the oscillator tube 129 is a sensitive indicator of the amplitude of bursts supplied at the oscillator ringing circuit, and, therefore, the relative amplitude of the chrominance signal being processed by the chrominance amplifier channel of the receiver and may be employed as the ACC voltage.

Referring again to the chroma amplifier 65 which follows the bandpass filter 63 and includes the pentode type amplifier tube 107, it will be seen that, with one exception, the amplifier is of generally conventional form. That is, the amplifier tube 107 includes, in addition to the control grid 106, a cathode 139, connected to ground as shown, a screen grid electrode 141, a suppressor grid electrode 143 and an anode 145. The suppressor grid of the amplifier tube is grounded in a conventional manner, while the anode 145 is connected to the alternating current output load circuit which includes the winding 109 and a parallel capacitor 147, the winding and capacitor being tuned to the chrominance signal frequency. The screen grid 141 is connected to a source of positive operating potential at the terminal 149 through a voltage dropping resistor 151 and is bypassed to ground for signal frequency by means of a bypass capacitor 153.

Figure 3:
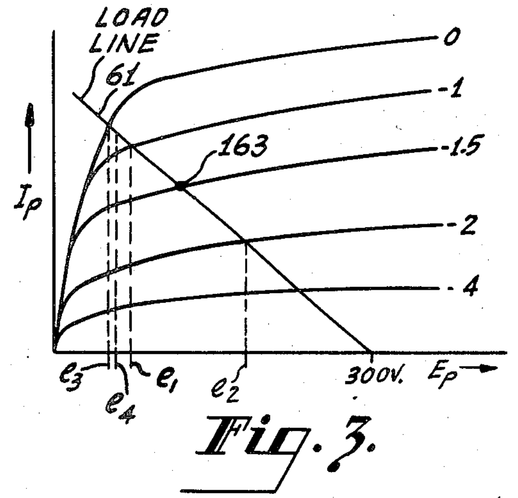
Figures 3 and 4 are graphs to be described.

As thus far described, it will be recognized that the amplifier circuit including the tube 107 is of the type having a constant current characteristic. That is to say, for values of anode voltage greater than a certain minimum value, the anode current through the tube changes only slightly with signal variations applied to its control grid. The anode voltage-anode current characteristics of such a tube for various control grid bias values are illustrated in Figure 3 wherein anode voltage $E_p$ is plotted along the abscissa and anode current is plotted along the ordinate axis. Such characteristics curves as those shown in Figure 3 are well known to those skilled in the art and need not be described in detail.

It will further be noted from Figure 2 that the otherwise conventional amplifier circuit 65 includes a rather large direct current load resistor 155 which may be of the order of 12–15 kilohms, for example, the resistor being bypassed to ground for alternating current by a capacitor 157. Specifically, the D.C. load resistor 155 is connected between the lower end of the alternating current load winding 109 and a source of positive operating potential (+B) at the terminal 159. The load line for this resistor is illustrated by the line 161 in Figure 3. In connection with constant current type electron discharge devices such as the pentode tube 107 whose characteristics are thus illustrated, it is known that at the control-grid-to-anode gain depends upon the division of the current between the anode and screen grid electrodes. Normally, therefore, the gain of such a device, measured with respect to its anode output circuit, will increase as the anode voltage increases with respect to the screen grid voltage, since more electrons are attracted to the anode than to the screen grid in such a case. Conversely, when the anode voltage is lower than the screen grid voltage, the gain of the tube is greatly reduced. This last fact may be explained in connection with the curves of Figure 3.

Assuming, for example, that a tube such as the amplifier tube 107 is operated with a control grid bias of minus 1½ volts and with such D.C. load resistor as to produce the load line 161, the quiescent operating point for the tube will be the point 163. Thus, an input signal swing of 1 volt peak-to-peak centered about the bias of −1.5 volts will produce an output voltage which swings between the values $e_1$ and $e_2$. When, however, the quiescent anode voltage point is changed, as by lowering the negative bias on the control grid to zero volts, for example, the same input signal swing will produce a much smaller and almost negligible anode voltage swing as represented between the lines $e_3$ and $e_4$. This action occurs by reason of the fact that the anode voltage is made effectively lower than the fixed screen grid voltage. Thus, it may be said that the gain of the tube has been reduced to a negligible value. The rapidity with which the gain of the tube may thus be reduced is also a function of the value of the D.C. load resistor 155, since the anode voltage is determined by the voltage (IR) drop across the resistor which is subtracted from the +B voltage at the terminal 159. Moreover, it is by virtue of the relatively simple and inexpensive addition of such a load resistor of the proper size to the conventional chrominance amplifier tube circuit that the novel self-killing action of the present invention is afforded.

In the operation of the circuit arrangement of Figure 2, the operating bias on the control grid 106 of the amplifier tube may be initially adjusted so that the combination of the automatic chroma control voltage available at the lead 89 and the adjustable bias voltage applied from a suitable source to the terminal 169 is a proper value for normal amplification in the circuit. By way of illustration, for a tube having the characteristic shown in Figure 3, and with an input signal swing of one or two volts peak-to-peak, a proper operating bias for the control grid 106 would be of the order of —1.5 or —2 volts D.C. By normal operation is meant the order of gain desired for the amplifier circuit when the incoming chrominance signal is of normal amplitude.

Figure 4:
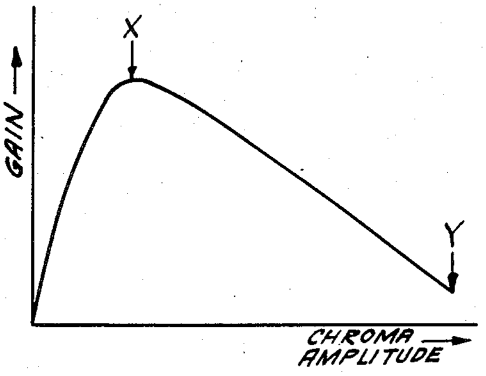

Insofar as the automatic chroma control action of the circuit is concerned, it will be appreciated that, as the burst component of the incoming chrominance signal increases slightly in amplitude, the grid current rectification in the oscillator tube 129 will produce a slightly more negative voltage at the lead 89, thereby resulting in a slightly increased negative bias on the control grid 106 of the chrominance amplifier tube to decrease the gain of that tube in an amount sufficient to return the chrominance signal amplitude to its normal value. When, on the other hand, the incoming chrominance signal decreases slightly in amplitude, a slightly less negative ACC voltage will be applied via the lead 89 to the control grid 106 so that the gain of the amplifier tube 107 increases in an amount sufficient to return the chrominance signal amplitude to its proper value. Such automatic chroma gain control action will be understood as taking place along the substantially linear portion of the curve of Figure 4 between the points X and Y, Figure 4 being a plot of gain variation as a function of chrominance signal amplitude. When however, the amplitude of the chrominance signal decreases below a predetermined value or when the received signal is a monochrome signal having no bursts, the ACC voltage at the lead 89 will become sufficiently less negative than its normal value so that the bias on the control grid 106 is reduced, for example, to zero, with the result that the gain of the amplifier tube decreases in the manner described to a negligible value. In this event, the chrominance amplifier 65 is substantially disabled or "killed." The self-killing action of the circuit is represented by that portion of the curve of Figure 4 between the origin and point X.

As will be appreciated from the foregoing, the novel circuit arrangement of the present invention as described thus far provides the desired color killing action without the use of auxiliary color killer tubes, requiring only the addition of a suitable load resistor in the anode circuit of the chrominance amplifier. In arrangements such as that of Figures 1 and 2, the burst take-off point in the receiver follows the anode circuit of the chrominance amplifier being controlled (e.g., the burst take-off winding 119 coupled to the anode coupling 109) such that the automatic chroma control voltage circuitry depends for its information upon the anode output of the chrominance amplifier. For such arrangements, means are provided in accordance with the invention for periodically enabling the self-killed chrominance amplifier during burst intervals so that, upon the resumption of color signal reception, the chrominance amplifier may be returned to its normal operating condition. Such means may take the simple form illustrated in Figure 2. Specifically, means are provided for applying to the anode of the chrominance amplifier tube 107, via a coupling capacitor 171, positive-going pulses 173 which may be derived from the horizontal output transformer of the deflection circuits 47 and which, as in the case of the pulses 57, correspond in time to the normal burst interval following each horizontal deflection synchronizing pulses. The effect of each pulse 173 is to raise the voltage of the anode 145 to a point at which normal gain of the circuit is afforded.

Thus, assuming that the chrominance amplifier 65 has been disabled upon the cessation of color signal reception, resumption of normal operation of the chrominance channel occurs when color television signals including the sync bursts are again received. The reason for this latter action is that, despite the disabled condition of the amplifier tube 107 during the image interval of the signal, bursts present in a received signal will be amplified by the tube 107 and applied to the burst separator for further application to the oscillator whose increase grid current produces a more negative ACC voltage, thereby increasing the bias on the amplifier tube 107 to the point at which the anode current drops below the value at which it kills the gain of the tube.

Figure 5:
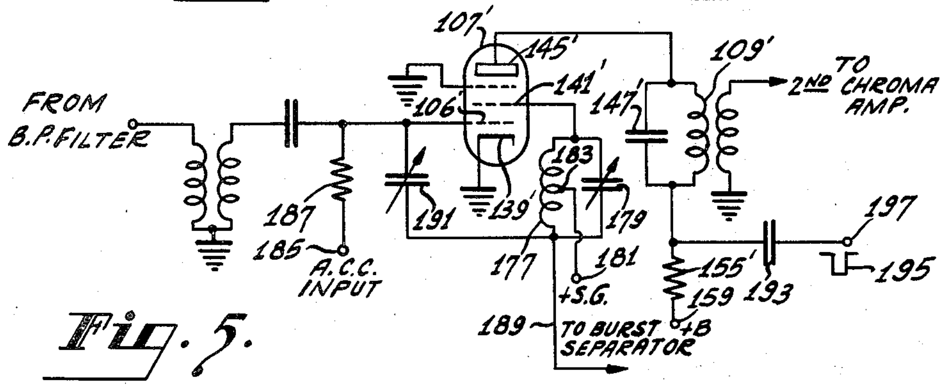
Figure 5 is a schematic circuit diagram illustrating another form of the invention.

Figure 5 illustrates another form of the invention, namely, one in which the burst take-off point in the chrominance channel precedes the anode output circuit of the amplifier tube which is controlled for self-killing action. The amplifier circuit of Figure 5 also includes a pentode type tube 107′ having a cathode 139′, control grid 106′, screen grid 141′ and suppressor grid 143′. Connected to the anode 145′ are an output load winding 109′ and parallel capacitor 147′ and a load resistor 155′ connected to a source of positive potential at the terminal 159′. The foregoing described elements are or may be the same as those elements of Figure 2 bearing the same reference numerals without the prime (′) notation.

The screen grid 141′ in Figure 5 is connected to one end of a winding 177 across which is connected a capacitor 179 such that the parallel combination 177, 179 is tuned to the color synchronizing burst frequency. Positive operating voltage for the screen grid 141′ is provided from a source 181 connected to an intermediate point 183 on the winding 177. The automatic chroma control voltage for the amplifier tube 107′ is applied from any suitable source (such as that illustrated in Figure 2) to the terminal 185 which, in turn, is connected to the control grid 106′ via a grid leak resistor 187. A lead 189 is connected to the winding 177 at its end remote from the screen grid 141′ and serves to apply chrominance signals to the burst separator (which may also be of the type shown in Figure 2).

In the operation of the circuit of Figure 5 as described thus far, the gain controlling action of the amplifier tube 107′ by means of the ACC voltage is substantially the same as that described in connection with the amplifier of Figure 2. There is, however, a primary difference, namely, the fact that the signals applied to the burst separator circuit are not cut off when the amplifier tube 107′ is disabled by its self-killing action. Rather, the gain of the screen grid circuit of the amplifier tube is sufficiently great when the amplifier anode circuit is substantially disabled that any bursts present in received signals are applied via the tuned screen grid circuit 177, 179 to the burst separator. Thus, it will be understood that the arrangement of Figure 5 does not require auxiliary means for periodically enabling the chrominance amplifier to resume normal operation upon the resumption of color signal reception.

It has been found in the operation of circuitry such as that shown in Figure 5 that oscillations may occur between the screen grid, control grid and cathode of the amplifier tube unless neutralizing means are provided. Such neutralizing means may take the form of neutralizing capacitor 191 which serves to apply to the control grid 106′ a voltage which is 180° out of phase with respect to the voltage on the screen grid 141′.

The burst-feedthrough action of the amplifier tube 107′ may be further enhanced by means for further increasing the gain of the screen grid circuit with respect to its anode circuit during burst intervals. Such means may comprise a coupling circuit including a capacitor 193 for applying to the anode 107′ negative flyback pulses 195 which may be supplied to the terminal 197 from a suitable pulse-take-off winding on the horizontal deflection output transformer. Each such pulse 195 serves to lower the gain of the anode circuit of the amplifier tube 107′ during its occurrence (or, in other words, during the burst interval), so that the gain of the screen grid circuit is correspondingly increased. That is, the pulses

195 serve, when the chrominance amplifier is operating normally during color signal reception, to insure a sufficient amplitude of burst for application to the burst separator circuit.

While the present invention has been described thus far in connection with controlled electron flow path devices of the pentode vacuum tube variety, it is to be noted that such other devices as presently available semiconductor transistors may also be employed in accordance with the invention. That is to say, commercial transistors of the 2N139 type have operating characteristics (D.C. collector-to-emitter volts versus D.C. collector milliamperes) of the same general constant current type as those of the pentode described above. Thus, the family of curves for various D.C. base currents for such a device resembles closely the $E_p$—$I_p$ curves of Figure 3 for the pentode tube.

Figure 6:
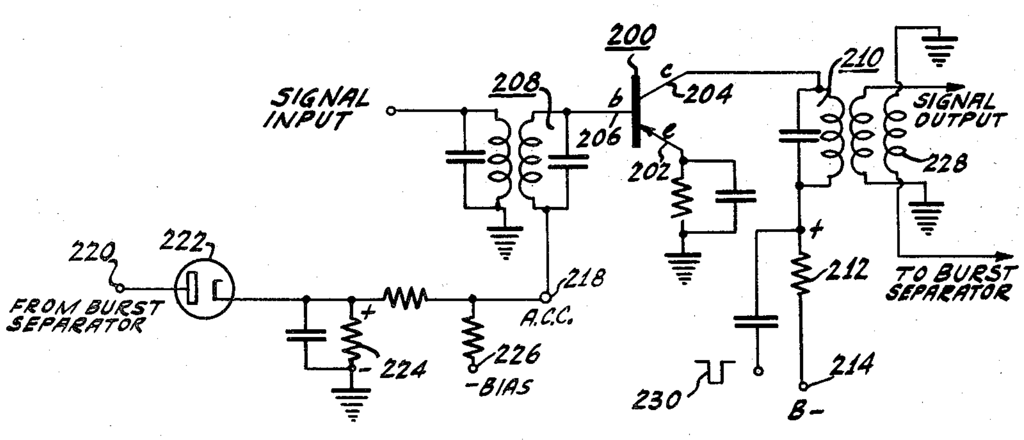
Figure 6 illustrates an embodiment in which the controlled electron flow path device is a semiconductor transistor amplifier.

Figure 6 illustrates a form of the invention embodying a transistor amplifier. In Figure 6, the transistor 200 may be of the p-n-p type having electron emitting and collecting electrodes 202 and 204, respectively, and a base electrode 206. The transistor amplifier is conventionally arranged with a base input circuit comprising the tuned circuit 208 which passes chrominance signal frequencies. The output signal of the transistor amplifier is derived across a parallel resonant circuit 210 which is connected between the collector 204 and one end of a load resistor 212, the other end of which is connected to a source of negative operating potential (−B) at the terminal 214. It is to be noted that the resistor 212 corresponds to the resistor 155 of Figure 2, in that the resistor 212 furnishes a voltage drop in response to collector current for controlling the collector voltage. An ACC voltage of suitable magnitude is applied to a terminal 218 for control of the voltage on the base electrode 206 of the transistor. For purposes of clarity, the base serves as an input circuit electrode, while the collector and emitter serve as output and common circuit electrodes, respectively.

In the operation of the circuit of Figure 6, the ACC voltage controls the gain of the transistor amplifier in a manner generally similar to that described for the vacuum tube embodiments, except that the ACC voltage applied to the terminal 218 must be one which becomes less negative as burst amplitude or signal strength increases. One circuit which may be employed for furnishing such an ACC voltage is also shown in Figure 6. Specifically, separated bursts from the composite signal are applied from the burst separator (not shown) via a terminal 220 to a rectifier diode 222 which produces across the resistor 204 a voltage which becomes more positive as burst amplitude increases. This positive-going voltage is combined with a negative voltage at the terminal 226 which is of such value that the voltage at the terminal 218 is at some least negative value (zero, for example) when burst amplitude is at its maximum value.

Increased chrominance signal amplitude will result in a less negative ACC voltage at the terminal 218 and, therefore, a reduction in the gain of the transistor amplifier. Conversely, decreased chrominance signal amplitude results in a more negative ACC voltage at the terminal 218 with a resultant increase in gain of the transistor circuit. When burst amplitude decreases beyond a predetermined value, the voltage at the ACC terminal will be sufficiently negative to increase the collector current of the transistor by such an amount that the voltage drop produced thereby across the resistor 212 renders the collector voltage sufficiently less negative than its normal operating value as to cause the transistor amplifier to operate below the "knee" of its characteristic curves. In this fashion, the amplification of the transistor is reduced to a negligible amount so that the chrominance amplifier is effectively disabled.

Where, as in the arrangement of Figure 6, the burst take-off point follows the output circuit of the transistor amplifier, as represented by the winding 228 which is inductively coupled to the output circuit 210, negative-going flyback pulses 230 may be coupled from a suitable source to the collector electrode 204 during burst intervals, thereby to render the transistor amplifier operative during those periods so that bursts, if present, are passed by the amplifier to the burst separator and, eventually, to the ACC rectifier circuit.

It will be appreciated that the transistor amplifier of Figure 6 is, by virtue of the inexpensive addition of a load resistor in accordance with the present invention, rendered capable of a self-killing action during the reception of monochrome signals.

Having thus described our invention, what we claim as new and desire to secure by Letters Patent is:

1. In a color television receiver of the type adapted to process either a color television signal which includes periodic color synchronizing components or a monochrome television signal lacking such component and having a chrominance signal channel for operating upon such a color signal, means for disabling such channel during the reception of such monochrome signal, said means comprising: a controlled electron flow path device in said channel and having an input, an output and a common circuit electrode; circuit means connecting said device as an amplifier having a constant current characteristic; means for applying a received signal to said input circuit electrode for controlling current conduction through said device; means for deriving an output signal from said output circuit electrode; a source of automatic control voltage which varies in amplitude as a function of the amplitude of such color synchronizing component in a received signal; and means for applying voltage from said source to said device to control current conduction of said device an as inverse function of such synchronizing component amplitude; said circuit means connecting said device as an amplifier including a resistor connected in series with said output circuit electrode, which resistor is of such value as to cause said device to operate below the knee of its characteristic curve in response to control voltages applied to said device when such color synchronizing components fall below a predetermined amplitude value to render said device ineffective to amplify received signals applied thereto.

2. In a color television receiver of the type adapted to process either a color television signal which includes periodic color synchronizing components or a monochrome television signal lacking such component and having a chrominance signal channel for operating upon such a color signal, means for disabling such channel during the reception of such monochrome signal, said means comprising: a controlled electron flow path device in said channel having an input, an output and a common circuit electrode; circuit means connecting said device as an amplifier having a constant current characteristic; means for applying a received signal to said input circuit electrode for controlling current conduction of said device; means for deriving an output signal from said output circuit electrode and for producing therefrom an automatic control voltage which varies in amplitude as a function of the amplitude of the color synchronizing component of a received color television signal; means for applying voltage from said last-named means to said device to control the current conduction of said device as a generally inverse function of the amplitude of such color synchronizing component, said circuit means connecting said device as an amplifier including a resistor connected in series with said output circuit electrode, which resistor is of such value as to cause said device to operate below the knee of its characteristic curve when such current conduction is greater than a predetermined value, whereby to decrease the gain of said amplifier to a substantially negligible value during reception of a signal wherein such color synchronizing component is lower in amplitude than a predetermined value; and means for periodically applying a voltage pulse to said output circuit electrode of such polarity as to increase the gain of said device during each interval in which a color synchronizing component would be present in a color television signal.

3. In a color television receiver of the type adapted to process either a color television signal which includes periodic color synchronizing components or a monochrome television signal lacking such component and having a chrominance signal channel for operating upon such a color signal, means for disabling such channel during the reception of a monochrome signal, said means comprising: a chrominance signal amplifier in such channel, said amplifier comprising an electron discharge device having an electron-emitting electrode and an electron collecting electrode and being of the constant current characteristic type; means for applying a received signal to said device in such manner as to control the current conduction of said device; circuit means coupled to said electron-collecting electrode for deriving an output signal, said circuit means including a resistance in series with the current path through said device; a source of automatic control signal varying in amplitude as a function of the amplitude of the color synchronizing component of received television signals; and means for applying such automatic control signal to said device in such manner as to increase current conduction therethrough generally inversely as the amplitude of such component of a received signal, said resistor being of such value as to cause said device to operate below the knee of its characteristic curve when such color synchronizing components fall below a predetermined amplitude value.

4. In a color television receiver of the type adapted to process either a color television signal which includes periodic color synchronizing components occurring at regular intervals or a monochrome television signal lacking such component and having a chrominance signal channel for operating upon such a color signal, means for disabling such channel during the reception of a monochrome signal, said means comprising: a chrominance signal amplifier in such channel, said amplifier comprising an electron discharge device having an electron-emitting electrode and an electron collecting electrode and being of the constant current characteristic type; means for applying received signal to said device in such manner as to control the current conduction of said device; circuit means coupled to said electron collecting electrode for deriving an output signal, said circuit means including a resistance in series with the current path through said device; a source of automatic control signal varying in amplitude as a function of the amplitude of such synchronizing component of received television signals; and means for applying such automatic control signal to said device in such manner as to increase the current conduction thereof generally inversely as the amplitude of such component of a received signal, said resistor being of such value as to cause said device to operate below the knee of its characteristic curve when such current is beyond a predetermined value whereby to decrease the gain of said amplifier to a substantially negligible value during the reception of a signal wherein said color synchronizing component is lower in amplitude than a predetermined value.

5. The invention as defined by claim 3 including means for periodically and at the time of such color synchronizing component applying a voltage pulse to said electron-collecting electrode of such polarity as to render said device operative during each such synchronizing component interval.

6. In a color television receiver of the type adapted to process either a color television signal which includes periodic color synchronizing components or a monochrome television signal lacking such component and having a chrominance signal channel for operating upon such a color signal, means for disabling such channel during the reception of such monochrome signal, said means comprising: an electron discharge device having a cathode, a control electrode, a screen grid electrode and an anode; means connecting said device in such channel as an amplifier having a constant current characteristics; means for applying a received signal to said control electrode to control the current conduction of said device; circuit means operatively connected to said anode for deriving an output signal, said circuit means including a resistance in series with said anode; means coupled to said screen grid electrode for deriving an output signal therefrom and for producing an automatic control signal varying in amplitude as a function of the amplitude of the color synchronizing component of a received signal; and means for applying such automatic control signal to said control electrode in such manner as to increase anode current conduction through said device with decreasing amplitude of such color synchronizing signal component, said resistor being of such value as to cause said device to operate below the knee of its characteristic curve when such color synchronizing components fall below a predetermined amplitude value.

7. In a color television receiver of the type adapted to process either a color television signal which includes periodic color synchronizing components or a monochrome television signal lacking such component and having a chrominance signal channel for operating upon such a color signal, means for disabling such channel during the reception of such monochrome signal, said means comprising: an electron discharge device having a cathode, a control electrode, a screen grid electrode and an anode; means connecting said device in such channel as an amplifier having a constant current characteristic; means for applying a received signal to said control electrode to control the current conduction of said device; circuit means operatively connected to said anode for deriving an output signal, said circuit means including a resistance in series with said anode; means coupled to said screen grid electrode for deriving an output signal therefrom and for producing an automatic control signal varying in amplitude as a function of the amplitude of the color synchronizing component of a received signal; and means for applying such automatic control signal to said control eletcrode in such manner as to increase anode current conduction through said device with decreasing amplitude of such color synchronizing signal component, said resistor being of such value as to cause said device to operate below the knee of its characteristic curve when such color synchronizing components fall below a predetermined amplitude value; and means for applying a periodic negative-going voltage pulse to said anode during each color synchronizing signal component interval whereby to increase the amplitude of the signal derived from said screen grid electrode.

8. In a color television receiver of the type adapted to process either a color television signal which includes periodic color synchronizing components occurring at regular intervals or a monochrome television signal lacking such component and having a chrominance signal channel for operating upon such a color signal, means for disabling such channel during the reception of a monochrome signal, said means comprising: an electron discharge device having a cathode, a control grid electrode, a screen grid electrode and an anode; circuit means connecting said device in said channel as an amplifier having a generally constant current anode voltage-vs.-anode current characteristic; means for applying a received signal to said control grid electrode to control the current conduction of said device; means coupled to said anode for deriving an output signal and including a resistance in series with the anode circuit of said device; a source of automatic control signal varying in amplitude as a function of the amplitude of the color synchronizing component of a received television signal; and means for applying such automatic control signal to said device in such manner as to increase anode current conduction of said device with a decrease in the amplitude of the color synchronizing signal component or a received signal, said resistor being of such value as to lower the anode voltage of said device to such a value that the gain of said device is substantially reduced when such color synchronizing components are lower in amplitude than a predetermined value.

9. In a color television receiver of the type adapted to process either a color television signal which includes color synchronizing components occuring at regular intervals or a monochrome television signal lacking such component, said receiver having a chrominance signal channel for operating upon such a color signal, means for disabling such channel during the reception of a monochrome signal, said means comprising: an electron discharge device having at least a cathode, a control grid electrode and anode; circuit means connecting said device in such channel as an amplifier; means for applying a received signal to said control grid electrode in such manner as to control the anode current conduction of said device; output circuit means operatively connected to said anode for deriving an output signal; a source of automatic control signal varying in amplitude as a function of the amplitude of the color synchronizing component of a received television signal; means including a resistor connected to said control grid electrode for applying to said control grid electrode such automatic control signal with such polarity as to render said control grid electrode less negative with decreasing amplitude of such color synchronizing component so as to reduce the gain of said amplifier to a substantially negligible value during the reception of a signal lacking such color synchronizing component.

10. In a color television receiver of the type adapted to process either a color television signal which includes periodic color synchronizing components occuring at regular intervals or a monochrome television signal lacking such components, said receivers having a chrominance signal channel for operating upon such a color signal; means for disabling such channel during the reception of a monochrome signal, said means comprising: an electron discharge device having a cathode, a control grid electrode, a screen grid electrode and an anode; circuit means connecting said device in such channel as an amplifier having a generally constant current anode voltage-vs.-anode current characteristic; means for applying a received signal to said control grid electrode in such manner as to control the current conduction of said device; circuit means operatively coupled to said anode for deriving an output signal; a resistor in series with said anode such that anode current conduction of said device produces a voltage drop across said resistor in such direction as to lower the anode voltage of said device; a source of negative automatic control signal which becomes less negative with a decrease in the amplitude of such color synchronizing component; and means for applying such control signal to said control grid electrode to increase current conduction through said device with decreasing color synchronizing component amplitude, said resistor being of such value as to lower the anode voltage of said device below the knee of its characteristic curve when such color components are lower in amplitude than a predetermined value.

References Cited in the file of this patent

UNITED STATES PATENTS

| | | |
|---|---|---|
| 2,236,066 | Poch | Mar. 25, 1941 |
| 2,289,291 | Moore | July 7, 1942 |
| 2,586,957 | Keizer | Feb. 26, 1952 |
| 2,653,187 | Luck | Sept. 22, 1953 |
| 2,681,379 | Schroeder | June 15, 1954 |
| 2,706,220 | Schlesinger | Apr. 12, 1955 |
| 2,736,765 | Lohman | Feb. 28, 1956 |
| 2,744,155 | Kihn | May 1, 1956 |
| 2,757,229 | Larky | July 31, 1956 |